Jan. 5, 1965
G. M. BURGWALD ETAL
3,164,019
MASS FLOW MEASURING DEVICE
Filed Oct. 26, 1961
3 Sheets-Sheet 1
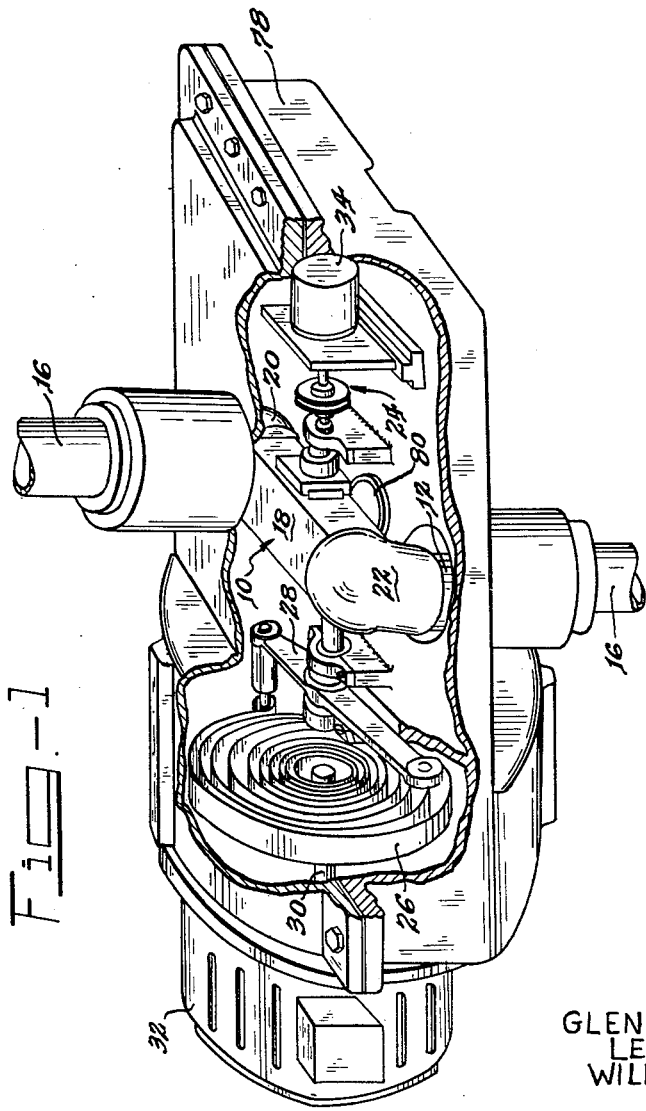
GLENN M. BURGWALD
LEONARD REIFFEL
WILLIAM K. GENTHE
CLAYTON FYFE
INVENTORS.
BY
ATTORNEY Jan. 5, 1965
G. M. BURGWALD ETAL
3,164,019
MASS FLOW MEASURING DEVICE
Filed Oct. 26, 1961
3 Sheets-Sheet 2
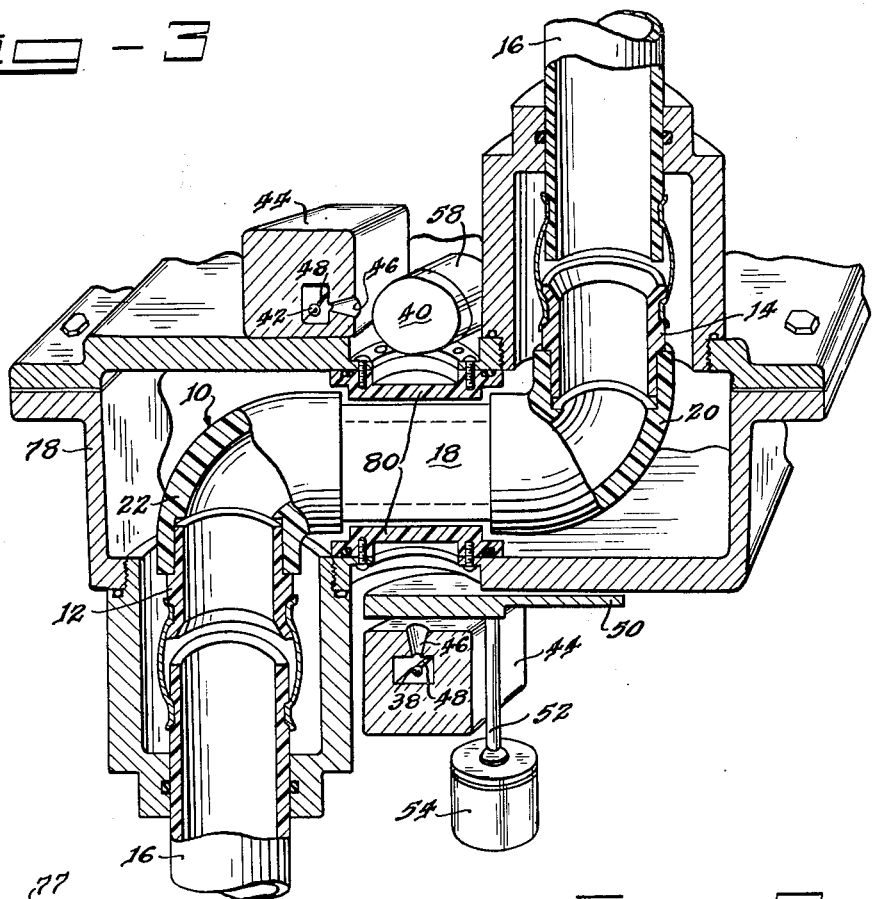
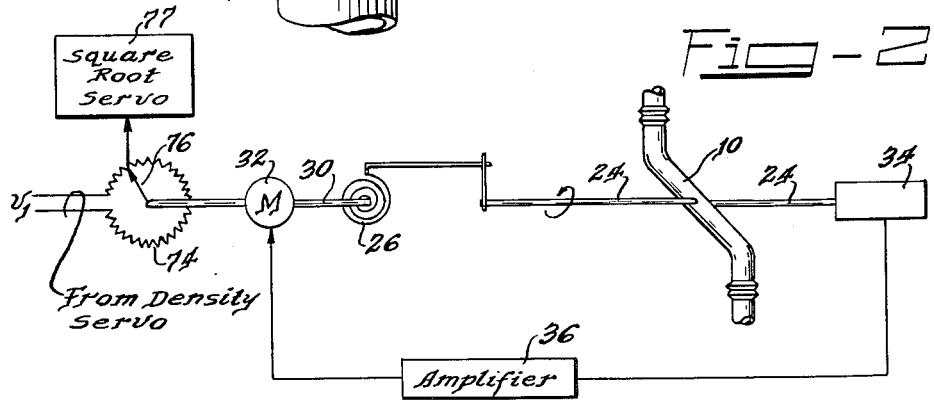
GLENN M. BURGWALD
LEONARD REIFFEL
WILLIAM K. GENTHE
CLAYTON FYFE
INVENTORS.
BY
ATTORNEY

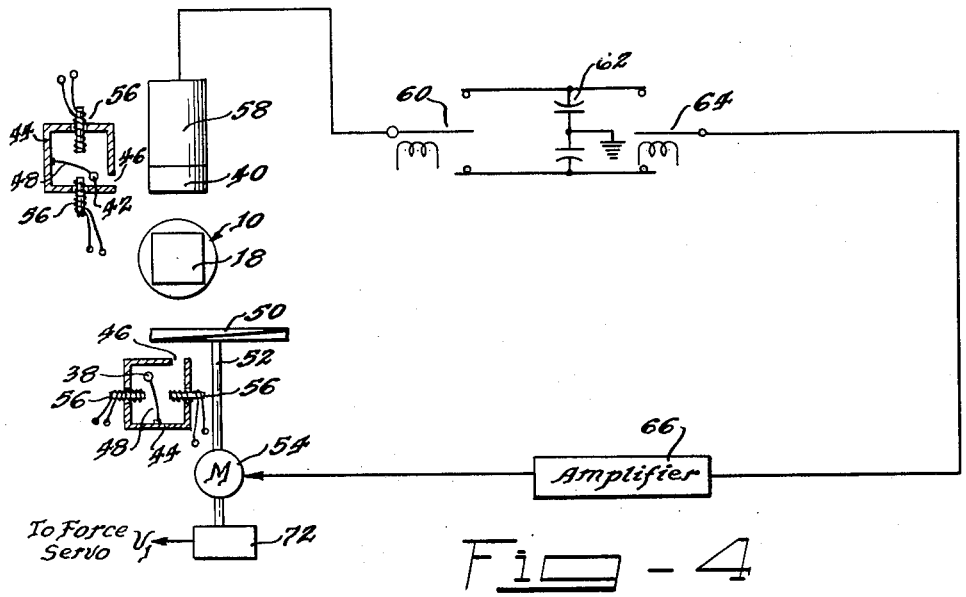
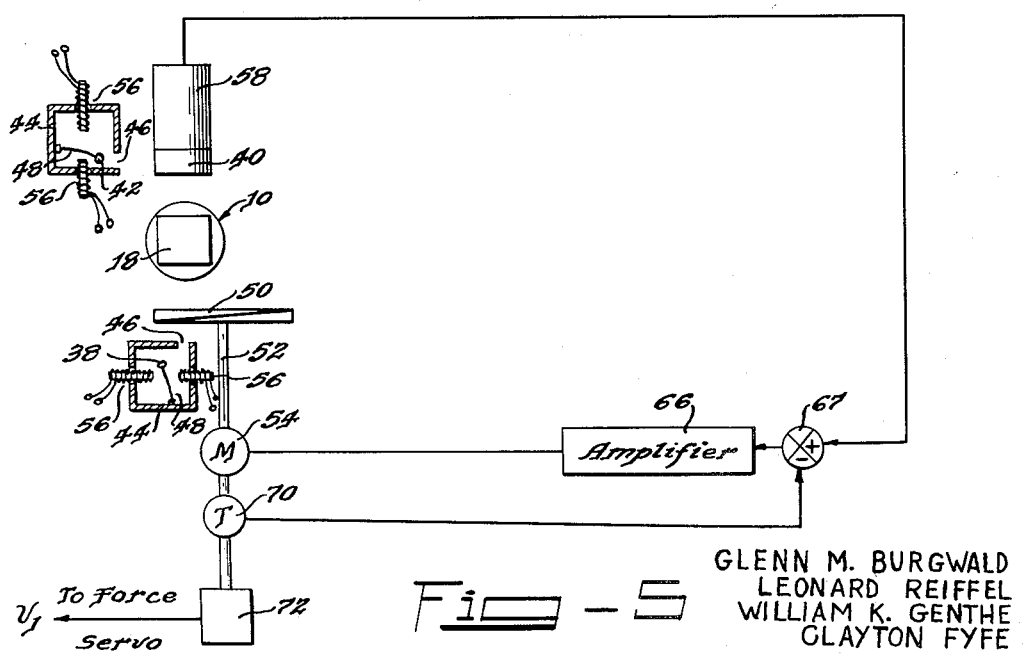

United States Patent Office 3,164,019
Patented Jan. 5, 1965

3,164,019
MASS FLOW MEASURING DEVICE
Glenn M. Burgwald, Belmont, Calif., Leonard Reiffel, Chicago, Ill., and William K. Genthe, Menomonee Falls, and Clayton Fyfe, Fox Point, Wis., assignors to the United States of America as represented by the United States Atomic Energy Commission
Filed Oct. 26, 1961, Ser. No. 147,998
7 Claims. (Cl. 73—228)

This invention relates to flow measurement devices and more specifically to devices for measuring mass flow.

A number of mass flow devices are currently available, however, they are designed for specific applications and not for general purpose use. Other difficulties arise with present devices when mass flow measurements are to be made of a fluid having a variable density. Where mass flow measurements are being made of a fluid having a constant density, the measurements are generally made external to the flow. However, when the density of the fluid is variable, the present devices require penetration of the flow to make mass flow measurements, i.e. U.S. Patent 2,683,369. Further, the response of present devices to transient changes in density is poor.

It is therefore one object of this invention to provide a general purpose mass flow measuring device.

It is another object of this invention to provide a mass flow measuring device wherein measurements are accomplished external to the flow of the measured fluid.

It is another object of this invention to provide a mass flow measuring device able to measure the mass flow rate of fluids having variable densities.

It is still another object of this invention to provide a mass flow measuring device responsive to transient density changes in a measured fluid.

Other objects will become more apparent as the detailed description proceeds.

In general, the present invention comprises an S-shaped insert flexibly coupled into a pipe wherein a fluid is caused to flow. Means external to the fluid flow are used to provide a measure of the torque caused by the fluid passing through the S-shaped insert and nuclear density gauge means, also external to the flow, are used to provide a measure of the density of the fluid. Multiplying means are used to provide a product of the measure of torque and the measure of density, which product is proportional to the square of the mass flow rate of the fluid in the pipe. A square root servo takes the square root of the product to give mass flow rate directly.

More complete understanding of the invention will best be obtained from consideration of the accompanying drawings in which:

FIG. 1 is a cut away view of a preferred embodiment of an apparatus for the present invention showing the torque measuring device therefor.

FIG. 2 is a schematic diagram of the torque measuring device of FIG. 1 showing the closed loop servo therefor.

FIG. 3 is a section of the apparatus of FIG. 1 showing the flow density measuring device therefor.

FIG. 4 is a schematic diagram of the flow density measuring device of FIG. 3 showing the closed loop servo therefor.

FIG. 5 is a schematic diagram of the flow density measuring device of FIG. 3 showing an alternate closed loop servo therefor.

In FIGS. 1 and 3, an S-shaped tube 10 is coupled via flexible couplings 12 and 14 to a pipe 16 through which flows a fluid whose mass flow rate is to be measured. The S-tube 10 comprises a straight central portion 18 and two curved end portions 20 and 22. The center-line of the S-tube 10 lies in one plane and the S-tube 10 is so curved that the longitudinal axis of each of the curved end portions 20 and 22 are parallel to each other and perpendicular to the longitudinal axis of the straight central portion 18. The straight central portion 18 of S-tube 10 has a square cross section to facilitate the measurement of the density of the fluid flowing therethrough.

A pivot 24 is mounted at the center of the straight central portion 18 of S-tube 10 and adapted to rotate therewith so that S-tube 10 will pivot thereabout in the plane of the centerline of S-tube 10 responsive to a torque generated by fluid flowing therethrough. The generated torque has the same sign regardless of the direction of flow, so the S-tube 10 response is bidirectional.

A calibrated coil spring 26 connected to pivot 24 via arm 28 resists torque generated by the passage of fluid through the S-tube 10. The coil spring 26 is wound by the shaft 30 of a torque motor 32, the torque motor 32 being responsive to signals from a synchro 34 connected to pivot 24. Thus, there is a closed loop servo which resists the torque generated in the S-tube 10 by fluid flowing therethrough and maintains the S-tube 10 at a null position.

Further understanding of the closed loop servo may be obtained by reference to the schematic representation thereof shown in FIG. 2. The rotor of synchro 34 is mechanically coupled to pivot 24 and an exciting voltage (not shown) applied to the windings thereof. The stator of synchro 34 is fixedly positioned so that when S-tube 10 is in a null position no voltage is generated therefrom. Whenever fluid flows through S-tube 10, the resulting generated torque causes S-tube 10 and pivot 24 to rotate. This in turn gives a signal output from synchro 34 which is proportional to the angular rotation of pivot 24. This signal is amplified by amplifier 36 and transmitted to the torque motor 32 which in turn winds coil spring 26 to cause pivot 24 and thus S-tube 10 to return to its null position. Thus, a linear relationship is obtained between generated torque and the angular position of the shaft of the torque motor 32. Since the generated torque is proportional to the square of the mass flow rate divided by the density of the liquid flowing through the S-tube 10, the angular position of the shaft of motor 32 is also proportional thereto.

Reference is now made to FIG. 3, a cross section of the embodiment of FIG. 1, wherein is illustrated an apparatus for the measurement of the density of the fluid flowing through S-tube 10. The measurement of the density of the fluid flowing through S-tube 10 is made at the same point on the straight central portion 18 thereof as the flow rate so that maximum accuracy is obtained when transients in fluid density occur.

A first radiation source 38 is positioned on one side of the straight central portion 18 of S-tube 10 and a scintillation crystal detector 40 is positioned on the side opposite thereto. The source 38 and detector 40 are positioned so that the path of detected radiation traverses the straight central portion 18 of S-tube 10 at the pivoting axis thereof and in a plane normal thereto. A smaller reference radiation source 42 is mounted on the same side of the straight central portion 18 of S-tube 10 as the detector 40 and is adjacent thereto. Both radiation sources 38 and 42 are contained in radiation shields 44 having apertures 46. The apertures 46 are positioned to allow the transmission of radiation from the sources 38 and 42 to the detector 40. Both radiation sources 38 and 42 are mounted on reeds 48 which are caused to vibrate at a low frequency. The reeds 48 vibrate out of phase with each other causing the radiation sources 38 and 42 to be alternately presented to their respective apertures 46. Thus, the detector 40 will alternately see radiation transmitted from source 38 and then from source 42.

A rotatable calibrated radiation attenuation wedge 50 is mounted between source 38 and the straight central portion 18 of S-tube 10. The wedge 50 is driven by shaft 52 of motor 54 responsive to an error signal derived from the detected radiations of radiation sources 38 and 42. The wedge 50 is thus automatically positioned so that the radiation as detected by scintillation detector 40 from source 38 is maintained equal to the radiation detected from reference source 42. Thus, the angular position of wedge 50 is proportional to the density of the fluid within S-tube 10 at the point where the radiation beam traverses S-tube 10, since density of the fluid is proportional to the amount of radiation absorbed thereby.

Further understanding of the nuclear density measuring device may be obtained by considering the servo loops shown in FIGS. 4 and 5. In FIG. 4, the reference radiation source 42 and the radiation source 38 mounted on their respective reeds 48 are caused to oscillate across their respective apertures 46 by magnetic actuating coils 56. As previously recited, the oscillation of the radiation sources 38 and 42 are out of phase with respect to each other and are at a predetermined low frequency. In the present example, line frequency (60 cycles per second) was used. This frequency may be varied, the minimum rate being determined by the desired response time of the servo. The wedge 50 is null positioned so that for a fluid having a specific density, the radiation absorption by the fluid and the wedge 50 is such that the detected radiation by detector 40 from source 38 is equal to the detected radiation from the reference radiation source 42. Thus, as the density of the fluid changes from the null density, the radiation detected by the detector 40 from radiation source 38 will change.

A photomultiplier tube 58 is directly coupled to the scintillation detector 40 to amplify the scintillations detected thereby of radiation from the sources 38 and 42. The output from photomultiplier 58 is a series of pulses, each alternate pulse being representative of the radiation level received from one of the radiation sources 38 or 42.

The output pulses from photomultiplier 58 are then commutated by a chopper 60 at the same low frequency as the radiation sources 38 and 42 are caused to oscillate. This commutation separates the pulses due to each radiation source 38 and 42 into separate pulse trains. Each pulse train, constituting a D.C. level, is integrated in an RC network 62 and sampled again at a 60 cycle rate by chopper 64 to provide a difference error signal input to amplifier 66. This difference error signal is a square wave at a 60 cycle rate which, in essence to motor 54, acts as an A.-C. wave. The amplitude swing of the square wave output is the difference of amplitude in D.C. voltages between the two R.H. terminals of network 62. As the density of the fluid flowing through S-tube 10 changes, its radiation absorption will change and thus a difference error signal will result to amplifier 66.

The output error signal from amplifier 66 is fed to motor 54 which, responsive thereto, positions wedge 50 via shaft 52 to a null position so that the received radiations from sources 38 and 42 are again equal. The angular position of the wedge 50 is therefore proportional to the radiation absorbed by the fluid flowing in S-tube 10 and hence proportional to the density thereof.

An alternate servo is shown in FIG. 5, since the commutating and sampling of the error signal of the servo in FIG. 4 requires a rather cumbersome circuit, a tachometer 70 is added responsive to the motor shaft 52 of motor 54. The output of the tachometer is fed back to amplifier 66 through an error sensing device 67 and thereby provides a long time constant without commutation and sampling. The dynamic response of the servo of FIG. 5 is quite similar to that of the servo of FIG. 4 and each will perform satisfactorily to achieve the desired objects of this invention.

A potentiometer 72 connected to the shaft 52 of motor 54 shown in FIGS. 4 and 5 generates a voltage proportional to the angular position of the wedge 50 and hence proportional to the density of the fluid flowing through S-tube 10. The output from potentiometer 72 is fed to a potentiometer 74 (FIG. 2) whose wiper arm 76 is mechanically positioned by the shaft 30 of motor 32 in the torque servo. The voltage generated by the wiper arm 76 of potentiometer 74 is therefore proportional to the square of the mass flow rate of the fluid through the S-tube 10. To obtain the mass flow rate, the output from the wiper arm 76 of potentiometer 74 is fed to a conventional square root servo 77, and if total mass flow rate is desired, thence to a conventional integrator (not shown).

As shown in FIGS. 1 and 3, the S-tube 10 is enclosed in an enclosure 78 which is filled with oil. The oil provides viscous damping for the torque servo and cancels the effects of line pressure and pressure losses along S-tube 10. Plastic windows 80 are provided in the enclosure 78 for the transmission of radiation therethrough from radiation source 38.

Persons skilled in the art will, of course, readily adapt the teachings of the invention to embodiments far different than the embodiments illustrated. Accordingly, the scope of the protection afforded the invention should not be limited to the particular embodiments thereof shown in the drawings and described above, but shall be determined only in accordance with the appended claims.

What is claimed is:

1. A device for providing a measure of the square of the mass flow rate divided by the density of a fluid flowing in a pipe comprising a tube having two end portions and a central portion lying in one plane, the central portion of said tube being offset from the two end portions thereof, means for elastically coupling said tube to said pipe, a pivot connected to the central portion of said tube, said pivot being rotatable with said tube in the plane thereof responsive to fluid flow through said tube, means for applying a restoring torque to said pivot to cause said tube to remain in a null position, and means for measuring the applied restoring torque, which torque is proportional to the square of the mass flow rate divided by the density of the fluid flowing in the pipe.

2. A device for providing a measure of the square of the mass flow rate divided by the density of a fluid flowing in a pipe comprising a tube having two end portions and a central portion lying in one plane, the central portion of said tube being offset from the two end portions thereof, first and second flexible couplings adapted to connect said tube to said pipe, a pivot connected to the central portion of said tube, said pivot being rotatable with said tube in the plane thereof responsive to fluid flow through said tube, a synchro, the rotor of said synchro being connected to rotate responsive to the angular position of said pivot, means for applying a voltage to said rotor, the stator of said synchro being positioned with respect to the rotor thereof so that the output therefrom is responsive to the angular position of said pivot, a calibrated coil spring having one end thereof connected to said pivot, a motor, means connecting the output of said synchro to energize said motor, means mechanically connecting said motor to the other end of said coil spring, whereby said tube is caused to remain in a null position and the angular position of the shaft of said motor provides a measure of the torque applied to said tube and hence the square of the mass flow rate divided by the density of the fluid flowing in the pipe.

3. A device for measuring mass flow rate of a fluid travelling through a pipe comprising a flexibly mounted insert providing a bend in said pipe, a pivot connected to said insert, said pivot being rotatable with said insert responsive to fluid flow through said insert, means for applying a restoring torque to said pivot to cause said insert to remain in a null position, means for measuring the applied restoring torque, which torque is proportional to the square of the mass flow rate of said fluid divided by the density thereof, nuclear density gauge means external to said pipe for providing a measure of the density of said fluid, multiplying means for providing a measure of the product of said measure of density and said measure of applied restoring torque, and means for providing a measure of the square root of said product measurement.

4. The device according to claim 3 wherein said torque restoring means comprise a synchro, the rotor of said synchro being connected to rotate responsive to the angular position of said pivot, means for applying a voltage to said rotor, the stator of said synchro being positioned with respect to the rotor thereof so that the output therefrom is responsive to the angular position of said pivot from a null position, a calibrated coil spring connected to said pivot, and a motor mechanically connected to apply a restoring torque to said insert through said coil spring responsive to the output of said synchro, whereby said insert is caused to remain in a null position, the angular position of the shaft of said motor providing a measure of the torque applied to said insert and hence the square of the mass flow rate of said fluid divided by the density thereof.

5. The device according to claim 4 wherein said nuclear density gauge means comprise a scintillation crystal detector mounted on one side of said insert, a first radioactive source mounted on the opposing side of said insert, a rotatable calibrated wedge mounted between said first source and said insert, a second radioactive source mounted adjacent said scintillation crystal detector, means for alternately exposing the radiations from said first and second radioactive sources to said scintillation crystal detector, means for positioning said calibrated wedge responsive to the difference in signals detected by said scintillation crystal detector from said first and second radioactive sources, and means for generating a voltage proportional to the angular position of said calibrated wedge, which voltage is a measure of the density of the fluid flowing in said insert.

6. A device for measuring the mass flow rate of a fluid traveling through a pipe comprising a tube having a centerline, a straight central portion, and curved end portions; the centerline of said tube lying in one plane; the tube being so curved that the longitudinal axis of each curved end portion is parallel to the other and perpendicular to the longitudinal axis of the straight central portion; means for elastically coupling said tube to said pipe; a pivot connected to the straight central portion of said tube; said pivot being rotatable with said tube in the plane of the centerline thereof responsive to fluid flow through said tube; means for applying a restoring torque to said pivot to cause said tube to remain in a null position; a potentiometer having a shaft and a wiper arm connected thereto; the shaft of said potentiometer being responsive to said torque restoring means; a scintillation crystal detector mounted on one side of the straight central portion of said tube; a first radioactive source mounted on the opposing side of the straight central portion of said tube; a rotatable calibrated wedge mounted between said first source and the straight central portion of said tube; a second radioactive source mounted adjacent said scintillation crystal detector; means for alternately exposing the radiations from said first and second radioactive sources to said scintillation crystal detector; means for positioning said calibrated wedge responsive to the difference in signals detected by said scintillation crystal detector from said first and second radioactive sources; means for generating a voltage proportional to the angular position of said calibrated wedge and applying the voltage across said potentiometer; the voltage measured across the wiper arm of said potentiometer being proportional to the square of the mass flow rate of said fluid through said tube; and means for providing a measure of the square root of the voltage across said wiper arm.

7. A device for measuring the mass flow rate of a fluid traveling through a pipe comprising a tube having a centerline, a straight central portion, and curved end portions; the centerline of said tube lying in one plane; the tube being so curved that the longitudinal axis of each curved end portion is parallel to the other and perpendicular to the longitudinal axis of the straight central portion; first and second flexible couplings adapted to connect said tube to said pipe; a pivot connected to the straight central portion of said tube; said pivot being rotatable with said tube in the plane of the centerline thereof responsive to fluid flow through said tube; a synchro; the rotor of said synchro being connected to rotate responsive to the angular position of said pivot; means for applying a voltage to said rotor; the stator of said synchro being positioned with respect to the rotor so that the output therefrom is responsive to the angular position of said pivot from a null position; a calibrated coil spring having one end thereof connected to said pivot; a motor; means connecting the output of said synchro to energize said motor; means mechanically connecting said motor to the other end of said coil spring; whereby a restoring torque is applied to said tube to cause it to remain in said null position; a potentiometer having a shaft and a wiper arm connected thereto; the shaft of said potentiometer being mechanically connected to said motor; a scintillation crystal detector mounted on one side of the straight central portion of said tube; a first radioactive source mounted on the opposing side of the straight central portion of said tube; the radiation from said first radioactive source traversing the straight central portion of said tube at the axis of rotation thereof and perpendicular thereto; a second radioactive source mounted adjacent said scintillation crystal detector; a rotatable calibrated wedge mounted between said first radioactive source and the straight central portion of said tube; means for alternately exposing the radiation from said first and second radioactive sources to said scintillation crystal detector at a predetermined frequency, means for commutating the output of said scintillation crystal detector at said predetermined frequency, such that signals derived from said first and second radioactive sources are thereby separated; means for integrating the separated signals from said first and second radioactive sources; means for alternately sampling the separate integrated signals from said first and second radioactive sources at a 60 cycle frequency to produce an error signal therefrom; a second motor; mechanically connected to rotatably position said calibrated wedge responsive to the error signal of said first and second radioactive sources; means for generating a voltage proportional to the angular position of said calibrated wedge and applying the voltage across said potentiometer; whereby the voltage across the wiper arm of said potentiometer is proportional to the square of the mass flow rate of said fluid through said tube; and means for providing a measure of the square root of the wiper arm voltage of said potentiometer.

References Cited by the Examiner
UNITED STATES PATENTS

| | | | |
|---|---|---|---|
| 1,401,299 | 12/21 | Wohlenberg | 73—228 |
| 2,538,785 | 1/51 | Karig | 73—228 |
| 2,593,339 | 4/52 | Ostermann et al. | 73—228 |
| 2,739,478 | 3/56 | Offner | 73—205 |
| 2,804,771 | 9/57 | Brown | 73—228 |
| 2,862,162 | 11/58 | Baring | 73—205 |
| 2,896,084 | 7/59 | MacDonald | 73—194 |
| 2,897,672 | 8/59 | Glasbrenner et al. | 73—228 |
| 2,949,775 | 8/60 | Newbold | 73—205 |
| 3,049,919 | 8/62 | Roth | 73—228 |

RICHARD C. QUEISSER, *Primary Examiner.*

ROBERT EVANS, *Examiner.*